(No Model.)

C. CARNAHAN.
CONTROLLER FOR TURN PLOWS.

No. 589,337. Patented Aug. 31, 1897.

Witnesses
Geo. E. Frech.
James W. Bevans

Inventor
Charles Carnahan,
By Pattison & Nesbit,
Attorney's

UNITED STATES PATENT OFFICE.

CHARLES CARNAHAN, OF YOUNGSVILLE, LOUISIANA.

CONTROLLER FOR TURN-PLOWS.

SPECIFICATION forming part of Letters Patent No. 589,337, dated August 31, 1897.

Application filed November 25, 1896. Serial No. 613,446. (No model.)

*To all whom it may concern:*

Be it known that I, CHARLES CARNAHAN, of Youngsville, in the parish of Lafayette and State of Louisiana, have invented certain new and useful Improvements in Controllers for Turn-Plows; and I do hereby declare the following to be a full, clear, and exact description of the invention, such as will enable others skilled in the art to which it pertains to make and use it, reference being had to the accompanying drawings, which form part of this specification.

My invention relates to improvements in turn-plow controllers; and its object is to provide a controller which extends outward over the moldboard and is adapted to be adjusted, the end of the controller being considerably above the ground and devoid of any downwardly-extending or vertical portion which the soil engages, whereby the soil is controlled as it is turned by the moldboard as may be desired.

I am aware that it is not new to provide fenders which have vertically-extending portions for arresting the soil when being operated upon by a shovel-plow and constructed to permit a portion of the soil, such as the small particles, to pass through the fender. My invention differs very radically from this in that it consists of a portion which simply extends outward in slightly an inclined position, with the end of the controlling portion above the ground and devoid of any downwardly-extending or vertical portion.

The usual fender, which has the vertical portion, cannot be used in connection with a turn-plow for the reason that the vertical portion would run into the ground being turned and would be broken or else stop the movement of the plow entirely; nor will my controller perform any function in connection with a shovel-plow to prevent the clods rolling upon the plants, because the end of the controlling portion of my device is above the ground and would not arrest the movement of clods outward on the plants. Each device has its separate function, one not being adapted to be used in the place of the other in any sense.

Figure 1:
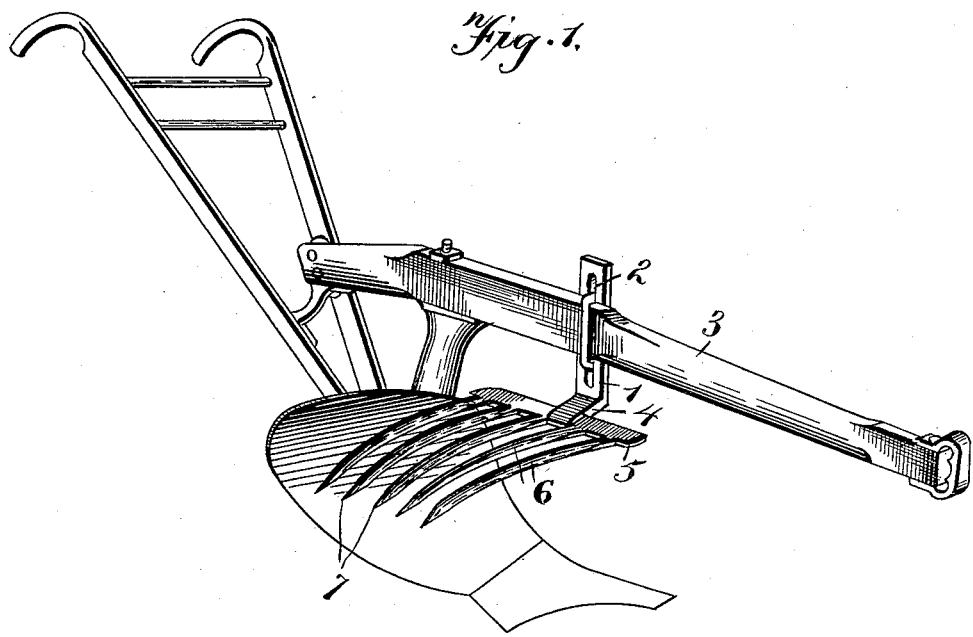
Figure 2:
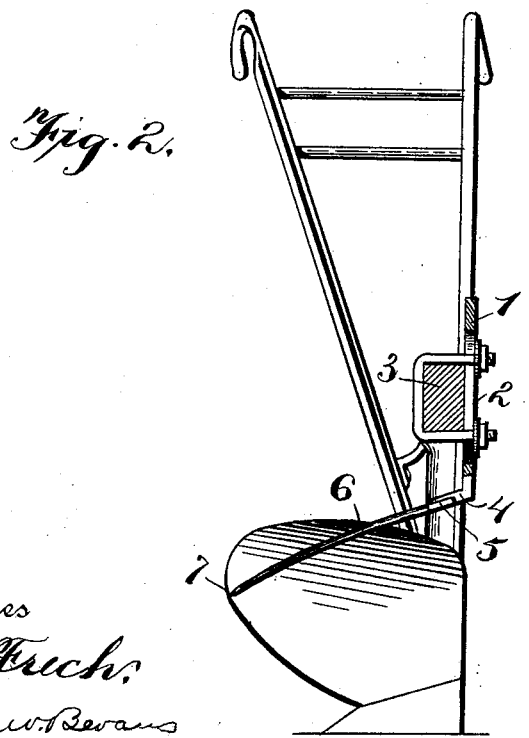

Referring now to the drawings, Figure 1 is a perspective view of my controller attached to a turn-plow. Fig. 2 is an end view of the same.

Reference is now had to the drawings, in which 3 indicates the plow-beam, to which my invention is adapted to be attached.

My device consists of a vertical standard 1, having a longitudinal slot 2, through which a staple or other suitable clamping device passes, and by means of which the standard is capable of adjustment up and down and back and forth upon the beam to adapt it to the particular work desired.

The lower end of the standard is bent outward in approximately a horizontal position, though preferably slightly declined, and attached intermediate its end to the end of the outwardly-extending arm 4 is a cross-bar 5. Projecting outward, and preferably slightly declined, and extending slightly backward, as illustrated, is the controlling portion of the device 6. This portion is here shown as consisting of a series of bars, the object of which is to prevent the sticking of the soil thereto as it is turned by the plow. However, the device would perform its function were this controlling portion made solid, except that the soil, if at all sticky, would adhere more to a solid portion than to a series of fingers or bars, as will be readily understood.

It will be noticed that my device has its controlling portion entirely devoid of any vertical portion, as in an ordinary fender, and that considerable space in a horizontal direction is left between the outer end of the controlling portion and the moldboard to permit the passage of the "land" as it is turned by the plow, which is in marked contradistinction to the fender having a vertical portion extending down to or below a horizontal line drawn from the shovel-plow, so as to permit the small portions of the earth to pass through, while preventing the passage of large clods. By means of a device of the construction I show the land can be controlled and permitted to pass any desired distance from the moldboard of a turn-plow by the adjustment of the controller.

My device is especially devised to work on ridged soil, as in the cultivation of cotton, while the fender before referred to is for use on level ground, and my controller is adapted to be used throughout the entire cultivation of cotton-plants. In laying by cotton the controller is so adjusted as to pass under the long branches, while the land passes under the end of the controller to the base of the plant to the degree desired by the adjustment of the controller. With the controller in proper position the land is thrown close to the plants. By the time the plants are ready for a second working the ground has become foul with young weeds, &c., which necessitated before the devising of my invention the hoeing of the field. The necessity for this with my controller is entirely prevented, and all that is necessary is to raise the controller a little higher on the beam of the plow and the second land is made to overlap the first, covering the new growth of weeds, while at the same time the young plants are not covered.

The land turned up by the plow is projected with considerable force against the controller, but owing to its construction and position no dirt sifts through it, but is controlled thereby and directed downward to and under the end thereof. The fingers 7 are placed sufficiently close to prevent the passage therethrough of any of the soil composing the land.

My invention is adapted to be used in the cultivation of other plants, as will be readily understood, such as hilling corn and laying by sweet potatoes, &c., with great advantage.

By having the controlling portion extending outward in practically a horizontal position it can be made to project under the branches of the plant, while at the same time permitting the passage of the land thereunder to the plants, the distance the land projects toward and against the plants being regulated by the adjustment of the controller up and down and back and forth upon the beam.

Having thus described my invention, what I claim, and desire to secure by Letters Patent, is—

A plow-controller comprising a vertical extension adapted to be adjustably connected with a plow-beam, a bar connected to the lower end of the standard and extending parallel with the beam, and a controlling-surface extending outward from the said parallel beam in approximately a horizontal position and consisting of fingers having a rearward sweep in respect to the horizontal bar, substantially as and for the purpose described.

In testimony whereof I affix my signature in presence of two witnesses.

CHARLES CARNAHAN.

Witnesses:
ANATOLE BONIN,
A. N. MARTIN.